United States Patent [19]

Fitzgerald et al.

[11] 4,303,921
[45] Dec. 1, 1981

[54] DIGITAL READOUT PRF MEASURING DEVICE

[75] Inventors: David L. Fitzgerald; Robert C. Olsen, both of Indianapolis, Ind.

[73] Assignee: The United States of America as represented by the Secretary of the Navy, Washington, D.C.

[21] Appl. No.: 5,389

[22] Filed: Jan. 2, 1970

[51] Int. Cl.³ ............................................. G01S 7/36
[52] U.S. Cl. .................................. 343/18 E; 343/17.7
[58] Field of Search ........................... 343/17.7, 18 E

[56] References Cited

U.S. PATENT DOCUMENTS

| | | | |
|---|---|---|---|
| 3,714,654 | 1/1973 | Wicks et al. | 343/18 E |
| 3,922,676 | 11/1975 | O'Berry et al. | 343/18 E X |
| 4,025,920 | 5/1977 | Reitboeck et al. | 343/18 E X |
| 4,146,892 | 3/1979 | Overman et al. | 343/18 E |
| 4,209,835 | 6/1980 | Guadagnolo | 343/18 E X |

*Primary Examiner*—T. H. Tubbesing

[57] ABSTRACT

A pulse repetition frequency (PRF) expanded display and coincident gating electronic intelligence gathering circuit for incorporating in radar receivers having the capability of gating the PRF signals of unknown origin to sort out signals having a particular PRF or band of PRFs with accuracy and resolution in a digital readout, with switching modes and switching positions to present several modes of intelligence about the PRF emitter.

8 Claims, 13 Drawing Figures

SCAN POSITION

SPR POSITION

TEST POSITION

4,303,921

DIGITAL READOUT PRF MEASURING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to radar PRF measurement and sorting of unknown electromagnetic emitters and more particularly to PRF digital readouts.

All electronic intelligence (ELINT) gathering systems require on-board signal processing if useful information is to be derived from complex electromagnetic environments. Intercepted electromagnetic signals can be classified and sorted according to signal parameters such as radio frequency (RF), pulsewidth, and PRF. Signal separation using RF as a sorting parameter has been used quite successfully; however, it is now common for many different types of emitters to use the same RF band. For most ELINT environments the second most useful sorting parameter is the PRF. Unfortunately, the processing equipment available to the Fleet operator has been very meager in terms of PRF accuracy and resolution. If an operator sets out to monitor activity at a certain PRF, about the only PRF filter available has been that between his ears. The pulse analyzers available have been analog scale devices with little more than 5% accuracy and even this accuracy has been doubtful for multi-signal environment.

SUMMARY OF THE INVENTION

In the present invention a PRF expanded display coincident gating circuit is coupled between the video input and a signal analyzer of a radar receiver. This circuit component is a compact unit which is coupled with conventional PRF radar pulse analyzers. It incorporates an accurate digital counter readout for PRF readout. This circuit provides several modes of operation to measure the Pulse Repetition Frequency (PRF), the scan rate, and the seconds per rotation (SPR) of the radar antenna of intercepted RF signals. The system consists of matching an internal variable time delay (Pulse Repetition Interval, PRI) with the unknown input PRI. The local PRI is then used in a self regenerating loop to obtain a PRF which is fed to the digital counter. The system provides several operating modes by selective switching to produce select marks, to expand the display, to select a particular PRF out of an environment of multiple signals, and to test the equipment during operation. It is accordingly a general object of the invention to provide a PRF expanded display and coincident gating circuit for coupling in a radar receiver to accurately count and sort an unknown emitted radar signal in an environment of a plurality of radar signals.

BRIEF DESCRIPTION OF THE DRAWINGS

These and other objects and the attendant advantages, features, and uses will become more apparent to those skilled in the art as the description proceeds when considered along with the accompanying drawings in which:

FIG. 3a illustrates the face of the analyzer display of a sample waveform which may be expected;

FIG. 4a illustrates a waveform display which may be expected on the analyzer display;

FIG. 5a illustrates the waveform expected of a target adjusted within the gate and its relation to a sync pulse;

FIG. 6a illustrates the expected waveform for the Generate Mode of the PRF Section selector switch;

DESCRIPTION OF THE PREFERRED EMBODIMENT

Figure 1:
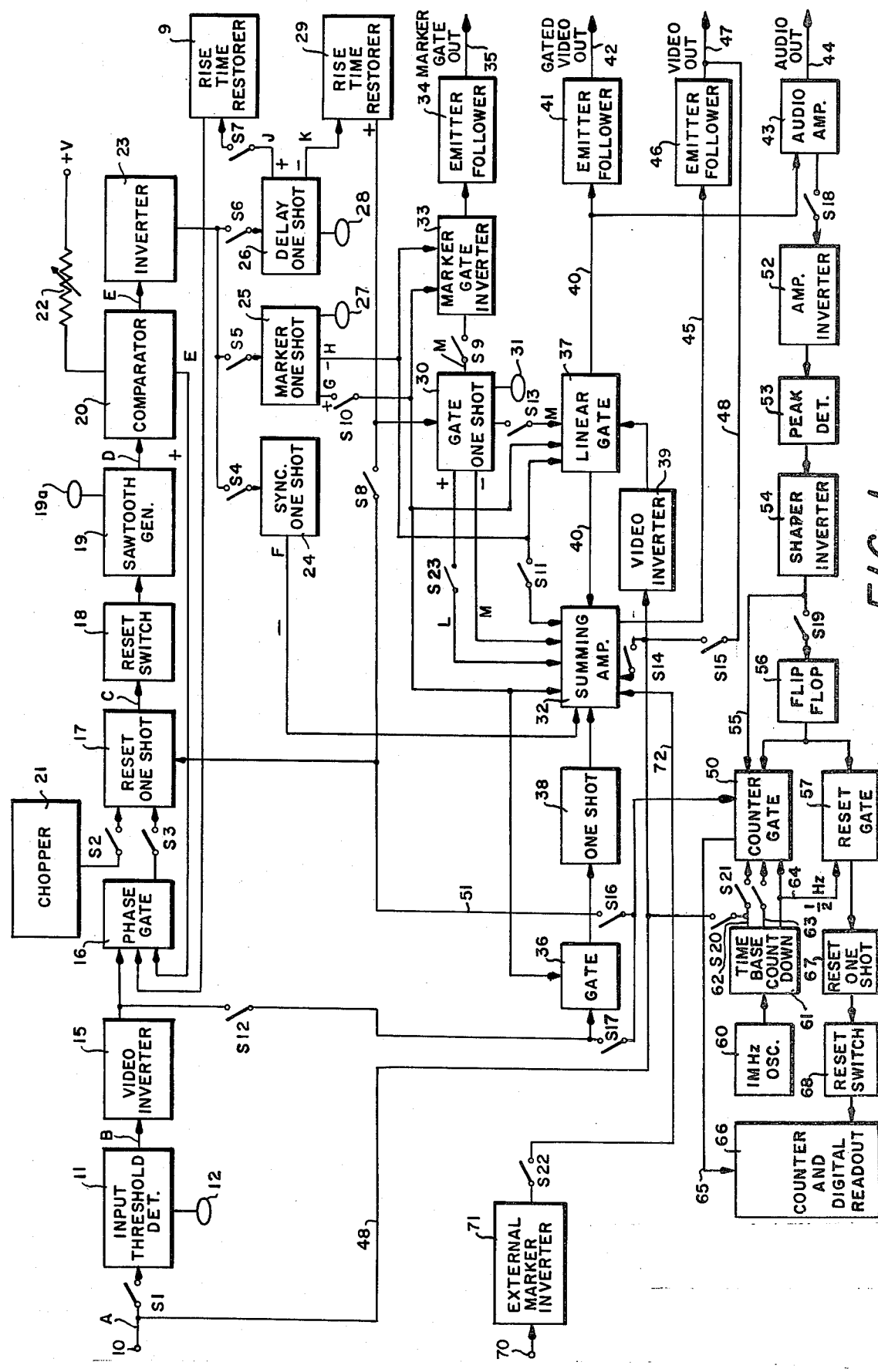
FIG. 1 is a complete block circuit diagram with switches illustrated at various points for switching into use various elements and components of this figure to provide the several modes and positions of operation and function illustrated in the following drawings.
Figure 2:
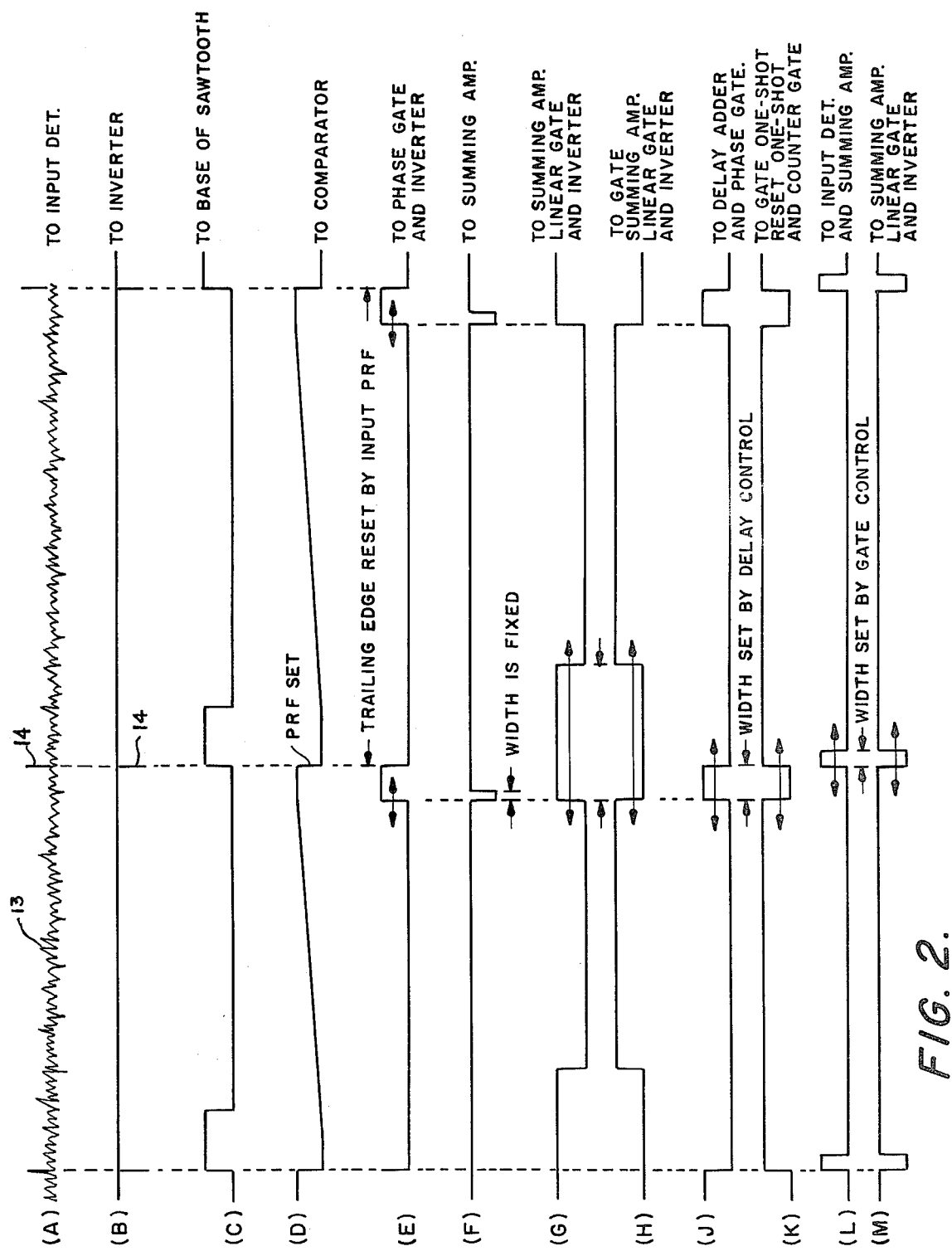
FIG. 2 shows the several waveforms appearing in the circuit block schematic of FIG. 1 at the several identified points.

Referring more particularly to FIG. 1 there is illustrated a block circuit schematic of the analyzer device of this invention with reference to FIG. 2 as applicable to the voltage waveform outputs at various points in the circuit. Circuit description will be given which involves two parts shown in FIG. 1. The first part of FIG. 1 is a circuit schematic diagram of the "PRF Section" of the circuit and part two of FIG. 1 will be a description of a "Counter Section" of the circuit.

PRF SECTION

The circuit of FIG. 1 is a type which may be incorporated in the circuit of a radar receiver to have the raw video applied thereto and the output thereof coupled to a radar analyzer, such as a cathode ray tube analyzer circuit. In the PRF Section of FIG. 1 the raw video input is applied to terminal 10 providing, for example, an input of noise plus signal as shown in FIG. 2, line A, appearing on line A in FIG. 1. This raw video is applied through a mode selector switch contact identified by the reference character S1 to an input threshold detector 11 which standardizes the video signal by producing a substantially squared pulse output as designated on the output line B and shown in waveform in line B of FIG. 2. The threshold of the input threshold detector is adjustable by any suitable means, as well known of such detector circuits, by a control illustrated as a knob 12 to adjust the threshold at any desirable point to eliminate the majority of the low amplitude noise signals or grass, such as 13 shown in FIG. 2, to sort out the signal 14 for consideration in this circuit. The output of the threshold detector 11 is coupled through a video inverter 15 to a phase gate 16 forming the first component of a phase loop consisting of a reset one-shot multivibrator 17, a reset switch 18, a sawtooth generator 19, and a comparator circuit 20. A second input to the reset one-shot circuit 17 is from a chopper circuit 21 through a mode selector switch S2 in a PRF selector or MODE switch means for switching in and out various components of the circuit. The phase gate 16 is likewise coupled through the mode switch S3 to the reset one-shot circuit 17. The inverted signal B of line B of FIG. 2, when permitted to pass through the phase gate 16, will trigger the reset one-shot circuit to produce on its output C the waveform as shown in line C of FIG. 2. The voltage signal C is applied to the reset switch 18, which may be in the form of a base controlled transistor, to produce an output drive for the sawtooth generator 19. The width of the waveform C is preset to establish the trailing edge to produce a time sufficient to completely discharge the capacitive reactance in the sawtooth generator to initiate a new sweep from zero potential, as is well understood by those skilled in the art and illustrated in line D, FIG. 2, initiating the sweep at the trailing edge of waveform C to produce the waveform D on the output of the sawtooth generator. The leading edge of waveform C is set by the video signal 14 which also establishes the fly back or trailing edge of the sawtooth wave. The sawtooth generator 19 has a coarse control 19a for setting the PRF range, as will later become clear. This waveform D from the sawtooth generator 19 is applied as one input to the comparator circuit 20, the other input of which is coupled from a positive voltage source through an adjustable resistor 22 to provide the reference voltage to be compared with the same amplitude of voltage on the sweep voltage D. When this compared referenced voltage is reached, the sawtooth voltage will flatten out as shown in line D, FIG. 2, to produce a leading edge on the output E, as shown by line E in FIG. 2, having a trailing edge at the instant of time of the occurrence of the video signal 14. The leading edge of the output voltage signal E, then, will vary in accordance with the adjustment of the resistor 22 and the trailing edge will be fixed by the video input signal 14. The variable resistance 22 provides a fine adjustment of the PRF band. One output E of the comparator 20 is fed back to the phase gate 16 for self blanking and prevents a video signal from 15 to pass until this voltage is positive. Phase gate 16 operates as an AND gate. The E output of the comparator 20 is also coupled through an inverter 23 to invert the E voltage and apply same through mode switches S4, S5, and S6 to a one-shot multivibrator 24 to produce a synchronizing signal F on the output therefrom, to a marker one-shot multivibrator 25 to produce outputs G and H, and to a delay one-shot multivibrator 26 to produce outputs J and K. The inverted E signal, as shown in FIG. 2 will produce the negative sync signal F shown in line F of FIG. 2 which will always occur with the leading edge coinciding with the leading edge of the signal E. The output G of the marker one-shot 25 is a positive signal and the output H of the marker one-shot 25 is a negative signal coinciding in leading and trailing edges as shown in lines G and H of FIG. 2 in which the leading edge will coincide with the leading edge of E in line E, FIG. 2. The output signal F from the sync one-shot 24 will always be fixed in width. The trailing edges of the output signals G and H from the marker one-shot are controllable by a width control 27 to provide 50 microseconds ($\mu$s) to 250 $\mu$s time delay although these two width designations may be changed to suit the marker coverage desired such as one control for 100 $\mu$s which may be increased to 500 $\mu$s, if desired. The delay one-shot 26 has a control means 28, as well understood for the control of one-shot multivibrators, to vary the delay of the voltage signals J and K on the outputs of 26. The positive output J is applied through a mode selector switch S7 and through a rise time restorer 9 to the phase gate 16 as the third input thereto. Both outputs J and K are adjusted by the control 28 to adjust the trailing edge of these two signals, the leading edge being adjustable by the controls 19a and 22 producing the inverted E output signal to the delay one-shot 26. By these three controls 19a, 22, and 28 the signals J and K can be made to appear left or right with as wide a control as set by the adjustment means. The output signal K from the delay one-shot 26 is applied through a rise time restorer circuit 29, the output of which is fed back through a mode selector switch S8 to the reset one-shot circuit 17 in the phase loop and also to a gate one-shot circuit 30. The gate one-shot 30 produces a positive voltage signal output L through mode selector switch S23 and a negative voltage signal output M coupled as two inputs to a summing amplifier 32, the output M also being coupled through the mode selector switch S9 to a marker gate inverter 33, the output of which is through an emitter follower 34 to produce a marker gate output voltage on the output conductor 35. The output L is not significant in the system and may be eliminated but can be switched in the system to test a positive voltage input to the summing amplifier or to nullify the effects of the M input or to level adjust the M input. The gate one-shot 30 has a width control 31 to adjust the width of the voltage output signals L and M, as shown in lines L and M of FIG. 2. The output of the sync one-shot 24 applies the negative signal F as another input to the summing amplifier 32 and the outputs G and H of the marker one-shot 25 are applied also as inputs to the summing amplifier 32, the output G being through mode selector switch S10 and the output H being through the mode selector switch S11. The output G of the marker one-shot 25 is also coupled through a branch circuit as an input to a gate circuit 36 and a second branch circuit as one input to a linear gate 37. The gate 36 has a standardized video signal from the output of the video inverter 15 through the mode selector switch S12, the output of gate 36 being through a one-shot multivibrator circuit 38 to the summing amplifier 32. The output H from the marker one-shot 25 is also coupled by a branch circuit as an input to the linear gate 37 and the negative output M from the gate one-shot 30 is also coupled as an input to the linear gate 37 through the mode selector switch S13. The raw video A is coupled from terminal 10 as another input to the summing amplifier 32 through the mode selector switch S14 and also as another input to the linear gate 37 through a video inverter 39. An output 40 from the linear gate 37 is applied as an input to the summing amplifier 32 and also through an emitter follower 41 to provide a gated video output 42 and also applied to an audio amplifier 43 to produce an audio output 44. The output of the summing amplifier 32 is by way of a conductor 45 through an emitter follower 46 to produce a video output 47. The raw video A from terminal 10 can also be coupled by way of the conductor means 48 through the mode selector switch S15 to the video output 47 for certain switch conditions such as the Bypass Mode later to be more fully described. The outputs 35 and 47 are for coupling to a radar analyzer such as a cathode ray tube display to show the various marker and video signals in visual form. The audio output 44 is, of course, coupled to ear phones or speaker to provide tone signals when outputs appear on the linear gate 37. Accordingly, the PRF of the video signal A, or of the chopper circuit 21, or both, may be displayed visually and heard audibly through the operation of the PRF Section hereinabove described.

COUNTER SECTION

The Counter Section of the circuit of FIG. 1 includes a counter gating circuit 50 to which is applied the signal out of the rise time restorer 29 through the mode selector switch S8 by way of the conductor means 51 through the mode selector switch S16 or a standardized video signal through the mode selector switch S12 and selector switch S17 in a manner of switching later to be more fully described in the description of operation. A second input to the counter gate 50 is from the audio amplifier 43 output through a mode selector switch S18 through an amplifier inverter 52, a peak detector 53, and a shaper inverter 54 by way of the conductor means 55. The output of the shaper inverter 54 is also coupled through the selector switch S19 to control a flip-flop circuit 56, the output of which is applied as a third input to the counter gate 50 and also as an input to a reset gate circuit 57.

The Counter Section of FIG. 1 has an accurate timing means generated by a one megahertz (MHz) oscillator 60 which is coupled through a time base countdown circuit 61 to produce 1000 Hz signals, 100 Hz signals, and one-half Hz square wave on outputs 62, 63, and 64, respectively. The output 62 is coupled by a branch circuit through the position selector switch S20 to the primary input terminal 10 and also through the selector switch S21 as another input to the counter gate circuit 50. The output 63 is coupled as another input to the counter gate circuit 50 for 100 Hz pulse count. The output from the counter gate circuit 50 is by way of a conductor means 65 to a counter and digital readout visual device 66, well known in the art for displaying a numeric count. The reset gate 57 is coupled through a reset one-shot multivibrator 67 and a reset driving switch 68 to the counter and digital readout circuit 66 to reset same to zero. The counter gate 50, then, will gate the pulses from the PRF Section of the circuit by way of conductors 51 and 55 and display the same digitally on the readout device 66. Under conditions of test, as will later be more fully described, the position selector switch S20 may be thrown to apply the 1000 Hz frequency by way of conductor 48 to the input 10 and cause a count to be registered on the counter 66 which should read exactly 1000 Hz to provide the proper operation of the PRF Section of the system shown in FIG. 1 as well as the counter circuit in the Counter Section. Under other conditions of normal position selector switching the counter and digital readout device 66 will register a count of the PRF of input signals applied to terminal 10 such as the PRF of the signal 14 shown in lines A and B of FIG. 2. To understand the various modes of operation actually used in the operation of this device FIGS. 3 through 9 will be described separately and only those elements and components of the circuitry will be reproduced in these figures for the particular mode described with the Counter Section and PRF Section selector switches S1 through S21 thrown to place the various elements in circuit, in a manner well understood and known in the use of selector switches. Since the PRF Section and Counter Section selector switches to control switches S1 through S21 may be readily purchased or constructed to provide the need of switches herein the particular switching arrangement will not be described further. Where it is desirable to introduce an external marker for display in addition to the gating and video signal markers such a signal may be introduced at terminal 70 through an external marker inverter 71 through the position selector switch S22 to the summing amplifier by way of the conductor means 72.

OPERATION

In the use and operation of this PRF measuring device it is to be understood that the electrical circuit of FIG. 1 is enclosed in a container with a control face having PRF Section and Counter Section selector switches thereon. The first selector switch for the PRF Section is divided into switch positions of Bypass, Marker, Expand, Selector, and Generate modes of operation while the Counter Section of the device is divided into switch positions of PRF, Scan, Seconds Per Revolution (SPR), Test, and External. The Bypass Mode is merely a switch position of the mode selector closing switch S15 and opening switch S1 which switches the input 10 directly through to the radar analyzer circuit eliminating the circuitry shown in FIG. 1 so that the present PRF measuring device of this invention is out of normal operation. Each of these modes of operation will be discussed in connection with the following signals in which only those circuit components and elements which are in the circuit under the PRF Section and Counter Section mode and position switches will be described. The position selector switches are placed usually in the PRF position for operating the Mode switch.

Figure 3:
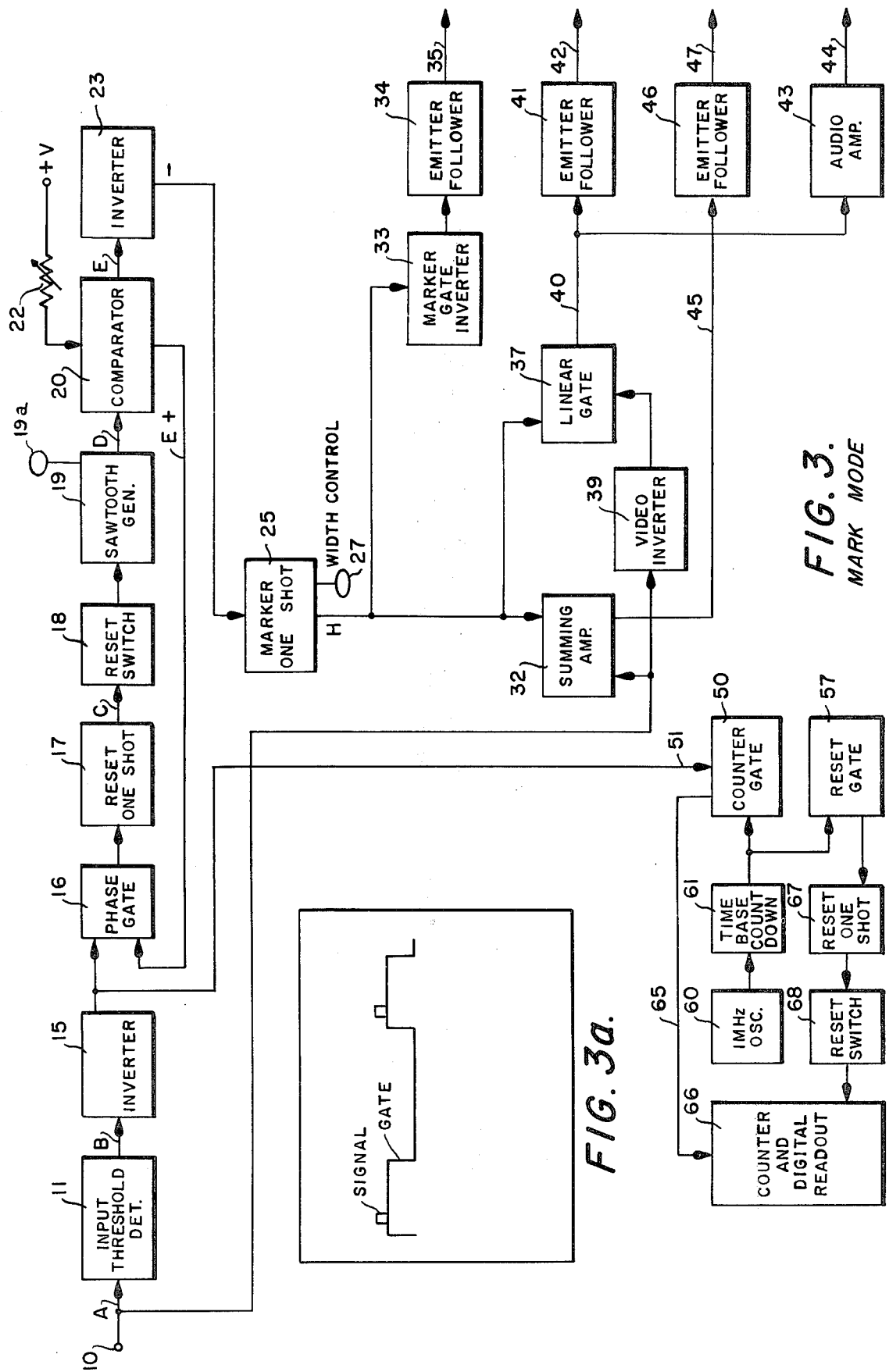
FIG. 3 illustrates in block circuit schematic that part of FIG. 1 utilized and switched for the Marker Mode of operation.

FIGS. 3 and 3a MARKER MODE

Referring more particularly to FIGS. 3 and 3a identified as the Marker Mode, the selector switches S1–S22 will be switched to place those elements in circuit shown in FIG. 3. The Counter Section will be switched to the PRF position. The marker one-shot circuit 25 will be preset by the width control 27 in either of two positions providing a 50 $\mu$s or 250 $\mu$s position. FIG. 3a illustrates the face of the pulse analyzer which is connected to the output terminals 35, 42, and 47 of the circuits shown in the drawings. The video signal to this pulse analyzer is ungated displaying all the PRFs and permitting a marker to be moved to the band of PRF activity of interest. However, the audio output on the conductor means 44 monitors only signals under the marker. In this Marker Mode the raw input video on terminal 10 is applied to the input threshold detector 11 which inverts the video and sets the threshold sensitivity of the analyzer (or noise rejection). The output of the input detector 11 is applied to the video inverter 15 which inverts the video to the phase gate 16. The phase gate output triggers the reset one-shot 17 which triggers the reset switch 18. The reset switch 18 resets the sawtooth generator 19 which in turn drives one input of the comparator circuit 20. The other input to the comparator circuit 20 is a DC voltage set by the variable resistance 22 providing a fine adjustment PRF control. The output pulse of the comparator is used as a self-blanking pulse applied in the phase loop to the phase gate 16. An input pulse cannot reset the sawtooth generator 19 until the self-blanking interval has been completed.

Inverter 23 inverts the output of the comparator 20 and triggers the marker one-shot 25 which in turn generates the 50 $\mu s$ or 250 $\mu s$ marker pulse. The leading edge of the marker pulse is preset by the course control 19a and the variable resistor fine control 22. The two high PRF ranges of the width control 27 automatically select a marker width of 50 $\mu s$. The two lower ranges select a 250 $\mu s$ marker. The negative marker pulse is applied to the summing amplifier 32 and to the marker gate inverter 33. The marker gate inverter 33 inverts the marker pulse and applies it through the emitter follower 34 to the output 35 adapted to be connected to a visual indicator analyzer as seen on the face in FIG. 3a.

In addition to the negative marker pulse to the inverting input of the summing amplifier 32, this summing amplifier receives raw video input from terminal 10 to the non-inverting input of the summing amplifier 32 which sums the two signals and applies the summed signal through the emitter follower 46 to the output conductor 47 for connection to the visual analyzer circuit as depicted in FIG. 3a. An audio output is generated in the Marker Mode by applying the negative marker one-shot and input video from the video inverter 39 to the linear gate 37. The linear gate 37 functions as an AND gate. When the marker and video pulses are in coincidence the video is applied to the emitter follower 41 and also to the audio amplifier 43. The audio amplifier 43 is coupled by its output conductor 44 to a sound transducer such as a pair of ear phones or speaker. In this Marker Mode, then, the marker pulses will be shown as in FIG. 3a when the marker is adjusted or controlled in the area of the video signal in which case the video signal will be superimposed upon the marker pulses as shown resulting from the output of the summing amplifier 32. In this Marker Mode the counter will count the standardized video to enable the operator to adjust the signal-to-noise ratio at the threshold detector 11.

Figure 4:
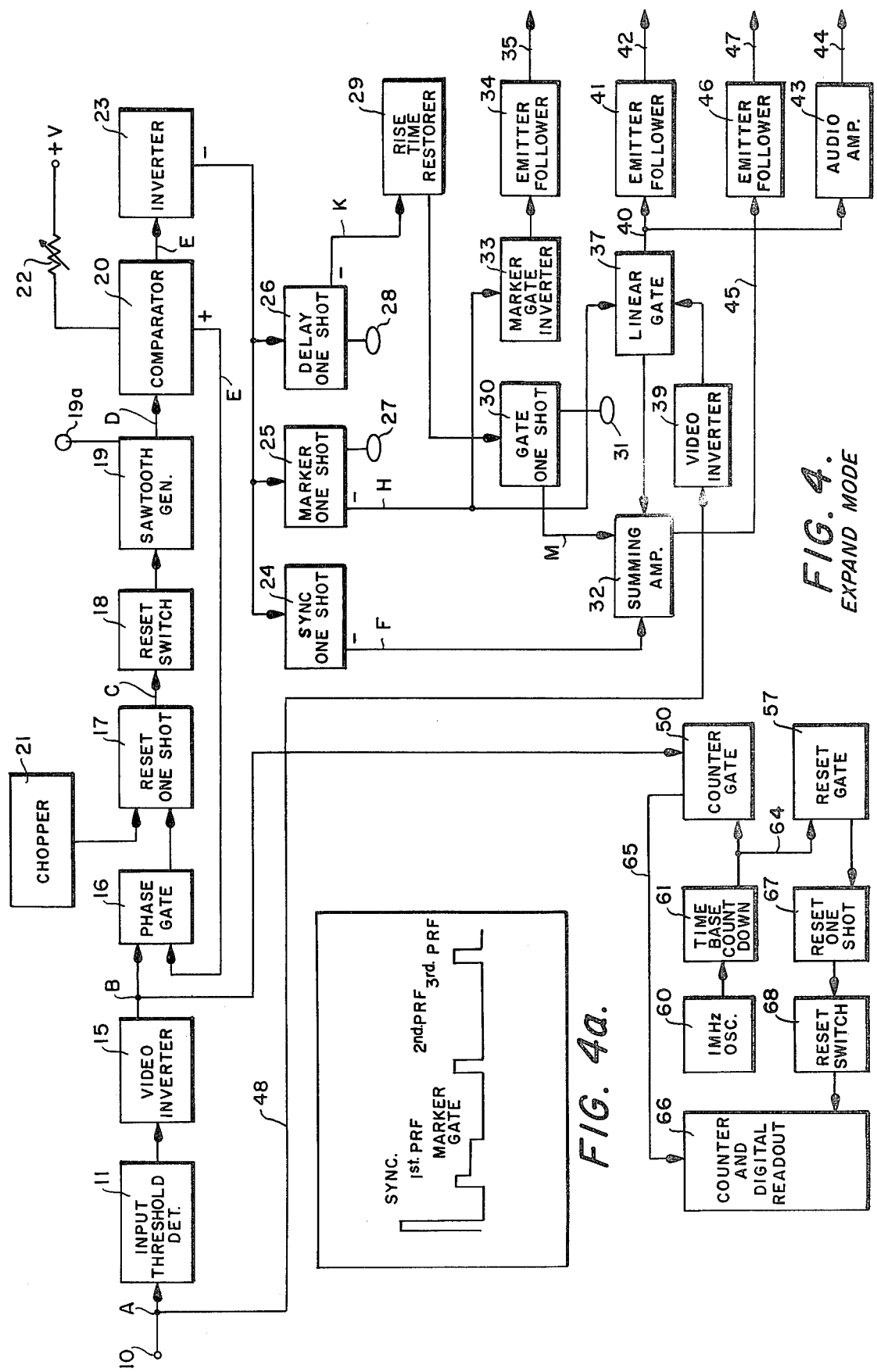
FIG. 4 illustrates a circuit schematic of the part of the circuit utilized as shown and switched in from FIG. 1 to provide an Expand Mode of operation.

FIGS. 4 and 4a EXPAND MODE

Referring more particularly to FIGS. 4 and 4a the part of the circuitry is shown switched in when the PRF Section of the selector switch is set in Expand Mode and the Counter Section is switched to the PRF Position, like reference characters always being applied to like parts in several views with that of FIG. 1. The Expand Mode is considered to be the primary operating mode. Once a PRF band is selected in the Marker Mode this band can be displayed on an analyzer having a fast sweep rate. Synchronization of the fast trace is obtained by adding a delayed sync pulse to the normal analyzer video input. The delayed sync pulse always occurs at the beginning of the selected PRF band. A particular Pulse Repetition Interval (PRI) is measured by moving the variable gate delay control 28 to the input pulse leading edge and then switching to a Generate Mode for the PRF readout, as will be more fully discussed in the Generate Mode with reference to FIGS. 6 and 6a. In this Expand Mode switching the chopper 21 frequency will reset the reset one-shot 17. The chopper rate is independent of any input pulse trains and aids the observation of all PRF signals in the selected band.

In this Expand Mode the phase loop consisting of phase gate 16, reset one-shot 17, reset switch 18, sawtooth generator 19, and comparator 20, operate as previously described for the Marker Mode except that the chopper 21 is switched into the circuit and applied to the reset one-shot 17. The chopper operates at a rate 20% of the incoming PRF, as determined by the coarse control 19a. Even when the phase loop is locked on a specific incoming PRF, the chopper pulse always takes precedence in triggering the reset one-shot 17. This causes the phase loop to lose lock-on to a specific incoming pulse train. Once the phase lockout is reset any new pulse train will be accepted by the phase gate 16. If a second PRF is within the phase lock loop range it will lock on this PRF until reset again by the chopper. The phase loop will now remain locked on to the second PRF until the chopper once again triggers the reset one-shot 17 at which time the phase loop may acquire the next pulse train input, etc. The chopper thus prevents the highest PRF from capturing the phase loop and allows two or more PRFs to pass through (time share) and be displayed on the external analyzer illustrated in FIG. 4a. If two or more PRFs are now allowed to pass through the inverter 23, the sync, marker, and delay one-shots 24, 25, and 26, respectively, will be triggered by whichever PRF is being passed through the phase lock loop. The phosphorus screen of the display analyzer retains the signals long enough to display all time shared signals without flickering. The display as shown in FIG. 4a will be lesser in intensity because two or more PRFs are time sharing the same trace. The effective display brightness of each is proportional to the number of PRFs. The counter readout 66 may be used to adjust the signal-to-noise ratio as in other modes. FIG. 4a shows one example of a display of the marker gate and the sync signal produced along with several PRF input signals at terminal 10.

Figure 5:
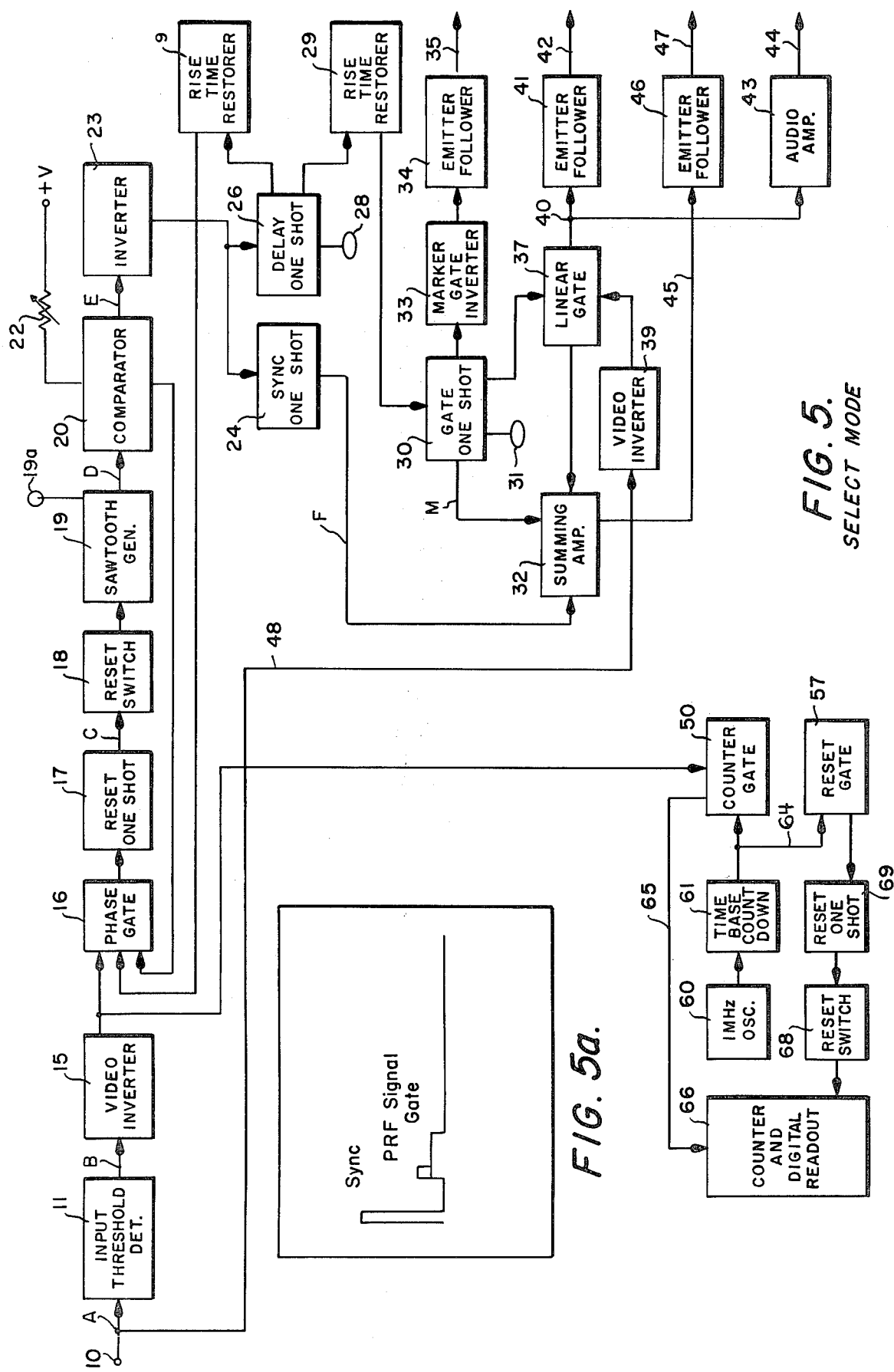
FIG. 5 illustrates that part of the circuit schematic diagram of FIG. 1 which is switched on to provide a target Select Mode of operation.

FIGS. 5 and 5a SELECT MODE

Referring more particularly to FIG. 5, that part of the circuit block diagram of FIG. 1 is shown as it would be switched on by the mode and position selector switches S1–S22. The Select Mode is used for pulse train sorting of one signal from the interfering background and other signals. By placing the gate pulse, as shown in FIG. 5a, over a selected target by the control of the variable resistor 22, only this selected target is gated through to the analyzer (FIG. 5a) for observation. At the same time an audio output will occur over the conductor 44. In this Select Mode the period of the self blanking interval is extended to the leading edge of the gate pulse. This prevents capture of the phase lock loop by a higher PRF than the one desired.

In the Select Mode the phase lock loop 16–20 locks on to only the input PRF determined by the gate established by the delay control 28 of the delay one-shot 26 and the gate position set by 22. The chopper 21 is de-energized for this mode of operation since only one PRF is desired. The output of the inverter 23 is applied to the sync and delay one-shots 24 and 26, respectively. The negative output of the sync one-shot 24 is applied to the summing amplifier 32. The negative output of the delay one-shot 26 is applied through the rise time restorer 29 to the gate one-shot 30. The negative output of the rise time restorer 9 is applied to the phase gate 16. The negative output of the gate one-shot 30 is applied to the summing amplifier 32, marker gate inverter 33, and linear gate 37. The output of the marker gate inverter 33 is applied through the emitter follower 34 to output 35 adapted for connection to a visual analyzer, the face of which is illustrated in FIG. 5a. The output of the linear gate 37 is now the video from the video inverter 39 which is in coincidence with the gate pulse. Raw video is applied to the video inverter 39 from the input terminal 10. The output from the linear gate 37 is applied through the emitter follower 41 to the output 42 for connection to the analyzer and also applied through the audio amplifier 43 to the audio output 44. In this Select Mode the linear gate 37 output is also applied to the summing amplifier 32 to sum with signals from the sync one-shot 24 and the gate one-shot 30.

The summing amplifier 32 sums the outputs from the linear gate 37 (gated video), the sync one-shot 24, and the gate one-shot 30 and applies the summed output over the conductor means 45 through the emitter follower 46 to the output 47 for connection and display on the external analyzer. The display on the analyzer now consists of the gate pulse and the video along with the sync pulse. The gate may be delayed by adjusting 28 of the delay one-shot 26 and opened by the delay one-shot 26 to position the gate under the selected PRF. The counter readout 66 may be used to adjust signal-to-noise ratios, as in prior modes. The Select Mode presents a display on the external analyzer as shown in FIG. 5a and prepares the circuit for subsequent digital counting to identify the selected PRF by frequency count.

Figure 6:
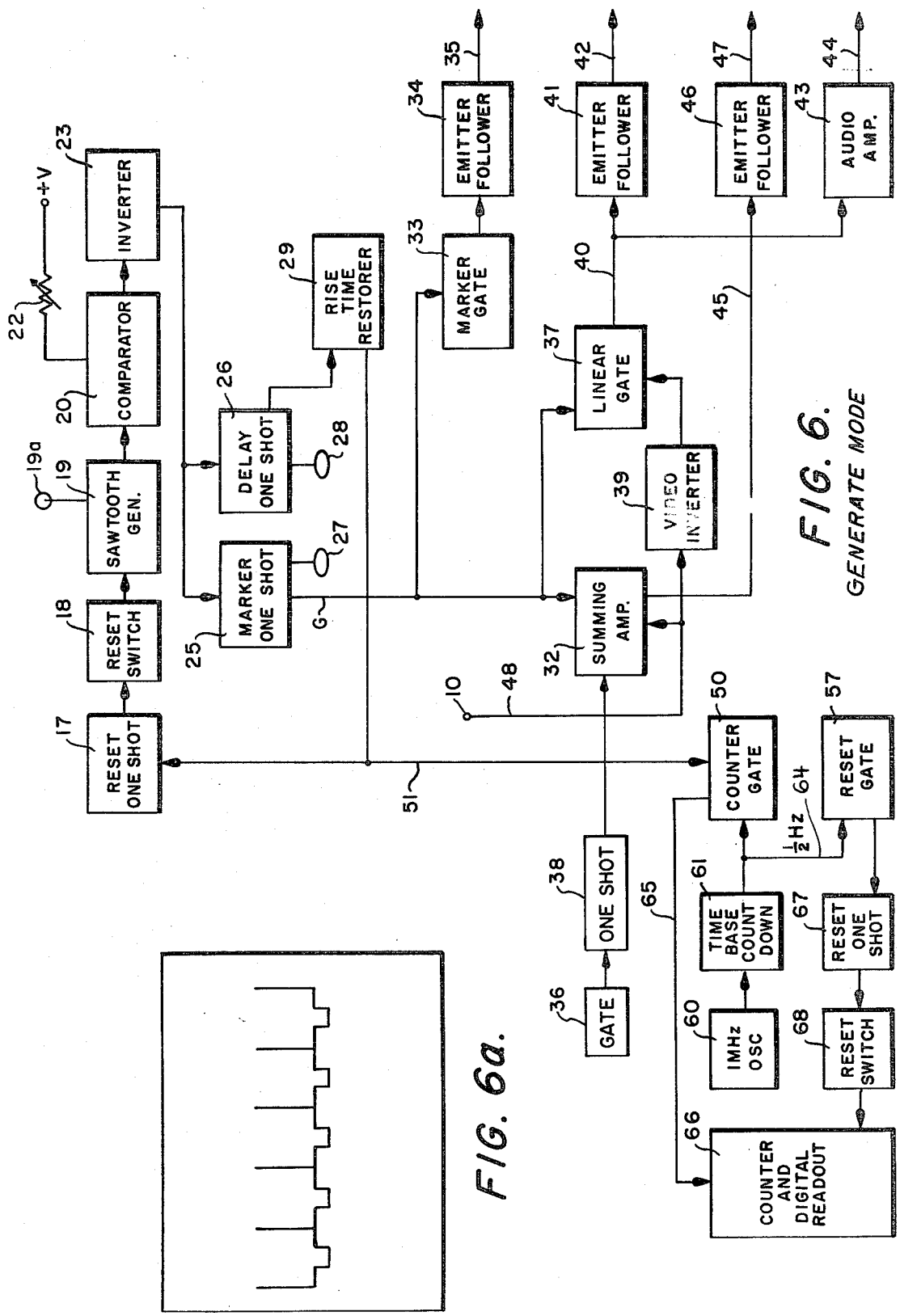
FIG. 6 illustrates in circuit schematic that part of the circuit of FIG. 1 which switches into the circuit to provide the Generate Mode of operation.

FIGS. 6 and 6a GENERATE MODE

Referring to FIG. 6, the circuit elements and components for the mode and position selector switches S1–S22 condition are set for the Generate Mode of operation and these elements and components are the only ones shown out of the total circuit of FIG. 1. In the Generate Mode the circuit 17–29 time delay is connected in a feedback loop configuration permitting self generation to occur. The self generated PRF is then combined with the raw video in the summing amplifier 32 and then fed to the external analyzer. The digital counting measurement of PRF in the Generate Mode bypasses the effects of input noise, interfering pulse trains, multipath signals, and scan modulation occurring with the input pulse train. In this Generate Mode the input of the signal on 10 is connected directly to the summing amplifier 32 by conductor 48. The reset one-shot 17 is triggered by the delay one-shot 26 forming a closed loop through the rise time restorer 29 back to the reset one-shot 17, the frequency of which is determined by the controls 19a, 22, and 28. The pulse out of the rise time restorer 29 is also applied to the counter gate 50 whose rate is to be counted and displayed in the readout 66 which will be a digital readout. The internal rate is adjusted to the unknown input PRF by observing the "strobe" effect on the analyzer.

The inputs to the counter gate 50 are the closed loop frequency and a one-half cycle per second square wave from the 1 MHz oscillator 60 and the time base countdown circuit 61. The positive one second portion of the square wave opens the counter gate 50 and the closed loop frequency is allowed to pass through the counter for one second which count is added up and registered on the readout 66. The leading edge of the positive portion of the one-half cycle per second square wave also triggers the reset gate 57 to reset the one-shot 67 to activate the reset switch 68 which resets the counter 66. The numeric readout 66 thus reads the frequency of the closed loop (and hence the input PRF) directly in pulses per second.

The output of the inverter 23 is also applied to the marker one-shot 25. The positive output G of the marker one-shot 25 is sent to the marker gate inverter 33, the linear gate 37, and the summing amplifier 32. The marker gate inverter 33 output is applied through emitter follower 34 to the output 35 for the display on the external analyzer, the face of which is shown in FIG. 6a as an example of a waveform that would be displayed. The linear gate 37 receives video from the video inverter 39 in addition to the positive marker from the marker one-shot 25. The positive marker blanks the linear gate so the only video that is allowed to pass is the video not in coincidence with the marker. If the frequency of the closed loop were exactly the frequency and in phase with the input video, the marker and video would be in coincidence and there would be no output from the linear gate 37. The output from the linear gate 37 is applied through the emitter follower 41 to the output 42 as well as through the audio amplifier 43 to the audio output 44. Any difference between the closed loop 17–23, 26, and 29 frequency and the incoming video on 10 will be heard as a beat note in the audio output 44. The summing amplifier 32 receives raw input video and sums it with the marker from the one-shot marker 25. The output of the summing amplifier 32 is applied through the emitter follower 46 to the output 47. In this manner the PRF can be displayed in waveforms on the external analyzer (FIG. 6a) and the actual PRF digital count for one second displayed by the readout 66.

FIG. 7 SCAN POSITION

Figure 7:
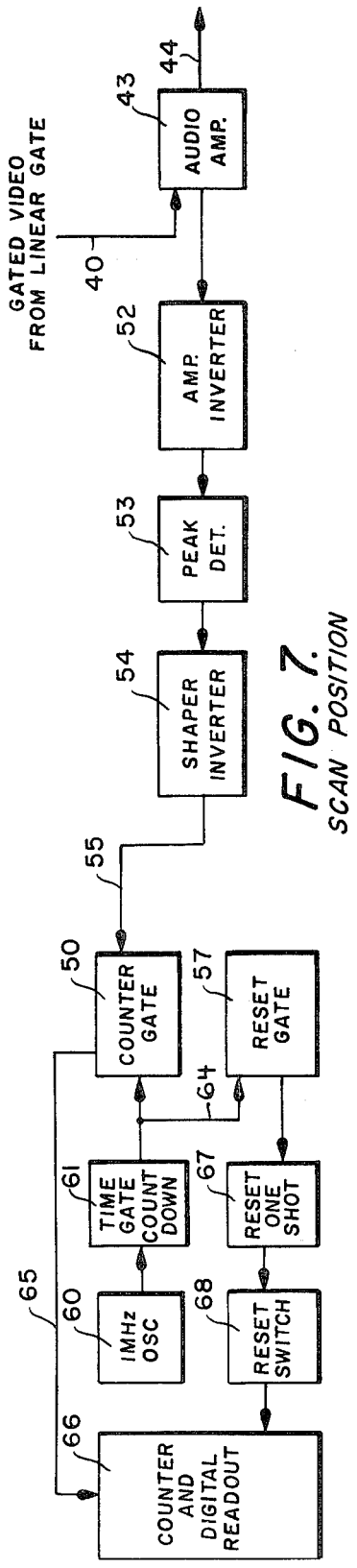
FIG. 7 illustrates a part of the circuit schematic of FIG. 1 which is switched in to provide a Scan Position of operation.

The mode and position selector switches S1–S22 are positioned to place the system in the modes of Mark or Select for the PRF Section and in the Scan Position in the Counter Section, the Counter Section elements and components in circuit operation being shown in FIG. 7. With the position selector switch set in the Scan Position, the external analyzer will measure the rate of any amplitude modulated input pulse train. In this position the gated video from the linear gate 37 is applied on conductor 40 to the audio amplifier 43. The nature of the gated video output of the linear gate 37 is determined by the PRF mode of operation. Normally the scan rate is measured with the analyzer in the Marker Mode; however, when a second PRF is interfering with the one to be measured, the Select Mode may be used.

The gated video from the linear gate 37 is applied to the audio amplifier where it is stretched and then applied to the amplifier inverter 52. The amplified and inverted stretched audio is sent to the peak detector 53 which detects a modulation envelope and sends it to the shaper inverter 54. The shaper inverter shapes the modulated waveform into a square wave suitable for counting by the counter gate 50. In addition to the scan square wave, the counter gate 50 receives a one second time base pulse from the 1 MHz oscillator 60 and the time base countdown circuits 61. The leading edge of the positive portion of the square wave turns the counter gate 50 "on" and triggers the reset gate 57. The counters in 66 are instantaneously reset through the reset one-shot 67 and the reset switch 68. The counter gate 50 continues to count for the one second period when the time base square wave is positive and shuts "off" when the square wave goes negative. The actual count of the scan modulated video signal is displayed during the one second period when the time base countdown square wave is negative. The readout 66 will be the digital display of the PRF frequency count for one second of the video PRF signal received on the input 10 of an emitter, such as an enemy radar transmitter.

FIG. 8 SPR POSITION

Figure 8:
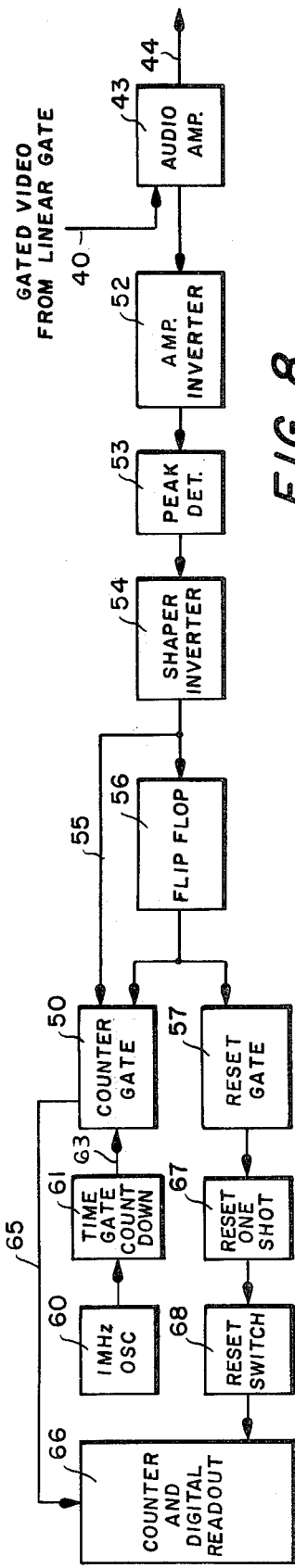
FIG. 8 illustrates in circuit schematic that part of the circuit of FIG. 1 switched in to provide the SPR Position of operation.
Figure 9:
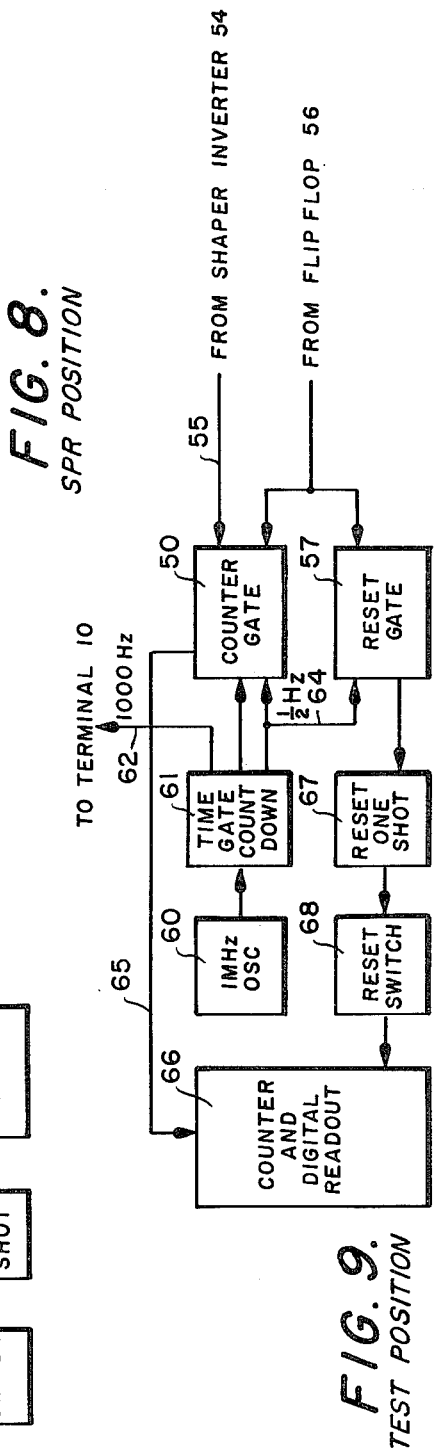
FIG. 9 illustrates that part of the circuit of FIG. 1 which is switched in the circuit to provide the Test Position of operation.

Referring more particularly to FIG. 8 for the Seconds Per Rotation (Position) of the counter circuit, the part of the block circuit schematic shown in FIG. 8 taken from FIG. 1 is the only part of the circuit used for this SPR position. Although the part of the circuit in FIG. 1 to produce the gated video input 40 from the linear gate 37 is not shown herein, the PRF Section of the circuit in FIG. 1 may have the mode switch in either the PRF Mode, Marker Mode, Expand Mode, or the Select Mode for this SPR Position of the position selector switch. The SPR Position is used to measure the time it takes a search radar antenna to make one rotation. In this position the gated video from the linear gate 37 of FIG. 1 is applied to the audio amplifier 43 in FIG. 8 under the same conditions as it was in the Scan Position. The gated video (modulated or unmodulated) is again stretched by the audio amplifier 43, amplified and inverted by the amplifier inverter 52, peak detected by the peak detector 53, and shaped and inverted by the shaper inverter 54. In the SPR Position the time constant of the stretching network is increased.

The SPR measurement is accurate when the main beam of the radar is being intercepted and not side lobes. Consequently, the input video will be a burst of pulses during the time the transmitting antenna faces the receiving antenna. This burst of input video pulses is shaped into positive pulses by the audio amplifier 43, the amplifier inverter 52, the peak detector 53, and the shaper inverter 54. This pulse out of the shaper inverter 54 causes the flip-flop circuit 56 to open and close the counter gate 50. The counter gate 50 will be opened and closed during alternating rotations of the antenna (not shown). During the time that the counter gate 50 remains open, it will count the number of pulses which are applied from the 1 MHz oscillator 60 and time base countdown circuits 61 applied over the conductor means 63. The output from the time base countdown circuit 61 applied to the counter gate 50 in this mode of operation is 100 Hz over the conductor 63. As an example, if the seconds per revolution of the transmitting antenna is 6.94, the time base countdown 61 will have produced 694 pulses during this time. The 694 pulses will pass through the counter gate 50 and be counted by the counter circuits 66 and displayed on the readout therein. The readout will thus display seconds per revolution in hundredths of a second.

When the flip-flop circuit 56 is turned "off" by the positive portion of the pulse out of the shaper inverter 54, the counter gate 50 is closed and the total count will remain displayed until the positive portion of the next pulse again triggers the flip-flop 56 causing the reset gate 57, the reset one-shot 67, and the reset switch 68 to cause the counter circuit 66 to be reset and the counter gate 50 to start a new count. In this manner the readout 66 will gate the count to the hundredth of a second for each complete revolution of the antenna (not shown).

FIG. 9 TEST POSITION

In the Test Position of the position selector switch for the Counter Section, only that portion of the counter circuit is shown which is in operation of interest but the remainder of the FIG. 1 circuit is in operation to receive the output 62 to the input terminal 10 and inputs from the shaper inverter 54 and flip-flop 56 to the counter. In this Test Position the 1 MHz oscillator 60, the time base countdown 61, counter and readout 66, and PRF Section are all tested for operation and accuracy. The one-half Hz square wave output 64 from the time base countdown 61 is applied to the reset gate 57 to reset the counters 66 and to the counter gate 50 to open and close this gate at the proper one second intervals. The 1000 Hz signals from the time base countdown 61 are applied by way of conductor means 62 to the input terminal 10. If the system is operating properly, the 1000 Hz signals will pass through the PRF Section and be counted in the Counter Section by an actual readout on 66 of 1000 for each alternate second of time; that is, on the positive one second square wave out of the time base countdown 61 to the counter gate 50 will add up the 1000 count on the readout 66 which will remain for one second on the negative one second portion of the square wave at which time the counter 66 will be reset. As long as the Position selector switch is in the Test Position a 1000 count will be read out by 66 for each alternate second. Any count other than 1000 would indicate a fault.

FIG. 1 EXTERNAL POSITION

Referring to FIG. 1 again in this External Position of the position selector switch in the counter circuit, the external marker pulse applied to terminal 70 is inverted in the external marker inverter 71 and applied over the conductor 72 to the summing amplifier. In this position the external marker is connected as the input video source instead of the video into terminal 10. The purpose of this mode is to allow the video input source to be switched into the system without the need for switching cables while the analyzer is in operation. This mode is otherwise the same as the PRF Position of position switch but the SCR, the Scan, and the Test modes cannot be used.

GENERAL OPERATION

The general operation of the circuit of FIG. 1 switched in the several PRF, Marker, Expand, Select, and Generate Modes of the mode selector switch in the PRF Section of the analyzer and the choice of the selector position of the position selector switch for the Scan Position, SPR Position, Test Position, and External Position may be used in various combinations as shown throughout FIGS. 3 through 9 to give the operator information as to the PRF count of any emitter from a radar transmitter for analyzation in this circuit. By using the various modes and positions of the selector switches the various information about the enemy PRF signal can be analyzed for countermeasures use. Where more than one signal appears, the enemy PRF signal can be selected as by using the Select Mode, shown in FIG. 5, and after analysis of this selected PRF signal another PRF signal may be then selected and anaylzed.

While many modifications and changes may be made to carry out the concept and intent of this invention, it is understood that we desire to be limited in the spirit of our invention only by the scope of the appended claims.

We claim:

1. An electronic intelligence signal processing circuit for coupling into the video circuit of a radar receiver for displaying and digitally reading out the PRF count of known and unknown PRF emitters comprising:
   an input of raw video PRF signals;
   an adjustable threshold detector coupled to said input to detect frequency signals above the adjusted threshold and for standardizing each detected frequency signal, said detector having an output;

a phase lock loop coupled to the output of said threshold detector with an adjustable comparator therein to adjust the leading edge of a pulse, the trailing edge of which is positioned by a PRF signal, said phase lock loop having an output;

synchronous, marker, and delay one-shot multivibrator circuits coupled in common to the output of said phase lock loop, said marker and delay one-shots having width and delay controls therein, respectively, each one-shot having outputs;

a summing amplifier having a plurality of inputs and a system output, said synchronous and marker one-shot outputs being coupled to inputs thereof, and said raw video input and standardized video being coupled to inputs thereof;

a gate one-shot, a marker gate inverter, and a linear gate being intercoupled, said gate one-shot being coupled to the output of said delay one-shot, and said marker gate inverter and said linear gate being coupled to the output of said marker one-shot with one output of said linear gate being coupled to said summing amplifier, said marker gate inverter having a system output for producing marker pulses thereon and said linear gate having a system output for producing gated video signals thereon, said linear gate system output being coupled in parallel with an audio amplifier for producing an audio output thereon;

a counter and digital readout circuit means having inputs coupled to said audio amplifier output, to said delay one-shot output, and to said raw video input to count PRF signals and simulated signals for digital readout to provide a numerical count of the signals produced on said system outputs; and selector switch means in said couplings for switching the circuit in various combinations of elements to different modes and switched positions to provide different types of information and test of known and unknown emitted PRF signals.

2. An electronic intelligence signal processing circuit as set forth in claim 1 wherein said phase lock loop includes a phase gate, a reset one-shot, a reset switch, a sawtooth generator, and a comparator with a variable reference voltage as a second input constituting said adjustable comparator, in this order from input to output, the output of said comparator being looped back as a second input to said phase gate together with an output of said delay one-shot to produce a phase lockon to standardized PRF video signals applied to the input thereof.

3. An electronic intelligence signal processing circuit as set forth in claim 1 wherein said synchronous one-shot produces a single negative fixed width output pulse, said marker and delay one-shots each have positive and negative outputs said marker one-shot having a manual width control to time the duration of output pulses and said delay one-shot having a manual delay control to delay the time of the output pulses, said output pulses from said delay one-shot to said phase gate and to said gate one-shot being through rise time restorer circuits.

4. An electronic intelligence signal processing circuit as set forth in claim 3 wherein said counter and digital readout circuit means includes an oscillator operating through a time base count down circuit to a counter gate which gates all inputs to a digital counter for numeric display, said time base count down circuit having its output coupled also to a reset gate operating through a reset one-shot and a reset switch to reset said digital counter, and wherein said coupling from said audio amplifier to said counter and digital readout circuit means is through an amplifier inverter, a peak detector, and shaper inverter to said counter gate.

5. An electronic intelligence signal processing circuit as set forth in claim 4 wherein said system outputs from said marker gate inverter, said linear gate, and said summing amplifier are through emitter followers to provide low impedance isolation output couplings adapted to be coupled to a radar analyzer display.

6. An electronic intelligence signal processing circuit as set forth in claim 5 wherein said selector switch means consists of one selector switch capable of circuiting combinations of the above-claimed elements for Bypass, Marker, Expand, Selector and Generate Modes of operation and of another selector switch capable of circuiting combinations of the above-claimed elements for PRF, Scan, Seconds Per Revolution, Test and External Positions of operation to provide different types of output information.

7. An electronic intelligence signal processing circuit as set forth in claim 6 wherein said phase lock loop includes a chopper circuit switchable by said selector switch in the expand mode to chop the inputs to said reset one-shot to time share more than one PRF signal applied to said input.

8. An electronic intelligence signal processing circuit as set forth in claim 7 wherein said external position of said other selector switch connects an external PRF simulated signal source to said summing amplifier to produce a simulated video output.

* * * * *